(12) United States Patent  
Mays (10) Patent No.: US 12,267,320 B2  
(45) Date of Patent: Apr. 1, 2025

(54) MULTI-USER BIOMETRIC AUTHENTICATION

(71) Applicant: Capital One Services, LLC, McLean, VA (US)

(72) Inventor: Son Mays, Ashburn, VA (US)

(73) Assignee: Capital One Services, LLC, McLean, VA (US)

(*) Notice: Subject to any disclaimer, the term of this patent is extended or adjusted under 35 U.S.C. 154(b) by 280 days.

(21) Appl. No.: 17/660,262

(22) Filed: Apr. 22, 2022

(65) Prior Publication Data

US 2023/0344827 A1 Oct. 26, 2023

(51) Int. Cl.
*G06Q 20/40* (2012.01)
*G06Q 20/22* (2012.01)
*H04L 9/40* (2022.01)

(52) U.S. Cl.
CPC ....... *H04L 63/0861* (2013.01); *G06Q 20/229* (2020.05); *G06Q 20/2295* (2020.05); *G06Q 20/40* (2013.01); *G06Q 20/401* (2013.01); *H04L 63/102* (2013.01)

(58) Field of Classification Search
CPC .. G06Q 20/229; G06Q 20/2295; G06Q 20/40; G06Q 20/401; H04L 63/0861
See application file for complete search history.

(56) References Cited

U.S. PATENT DOCUMENTS

| 6,697,947 | B1 | 2/2004 | Matyas, Jr. et al. |
| 11,295,313 | B1 * | 4/2022 | Russell ............... G06Q 20/387 |
| 11,489,842 | B1 * | 11/2022 | Russell .................. H04L 63/20 |
| 2017/0186014 | A1 * | 6/2017 | Nowak .................. G06Q 40/02 |
| 2019/0057385 | A1 * | 2/2019 | Nair ..................... G06Q 20/308 |
| 2021/0065185 | A1 * | 3/2021 | Krishnanand ...... G06Q 20/2295 |
| 2023/0146678 | A1 * | 5/2023 | Barnum ................ G06V 40/13 726/17 |

FOREIGN PATENT DOCUMENTS

| KR | 20220127531 A | * | 3/2021 | |
| WO | WO-2018005837 A1 | * | 1/2018 | ............. G06Q 20/02 |
| WO | WO-2022134760 A1 | * | 6/2022 | |

OTHER PUBLICATIONS

Jeanne Lee, "More Banks Turn to Biometrics to Keep an Eye on Security", May 20, 2016, obtained online from <https://www.nerdwallet.com/article/banking/biometrics-when-your-bank-scans-your-voice-face-or-eyes>, retrieved on Mar. 23, 2024 (Year: 2016).*

* cited by examiner

Primary Examiner — Zhimei Zhu
(74) *Attorney, Agent, or Firm* — Harrity & Harrity, LLP (57) ABSTRACT

In some implementations, a system may receive interaction request data indicating a request by a first user to perform a requested interaction via a user account, wherein the first user is associated with the user account. The interaction request data may indicate a first user identifier and first user biometric authentication data associated with the first user. The system may identify a second user identifier associated with a second user associated with the user account. If the system determines that an authorization condition is satisfied, the system may transmit, to a second user device associated with the second user, a second user authentication. The system may receive, from the second user device, second user biometric authentication data associated with the second user. The system may authorize the requested interaction based on receiving the second user biometric authentication data within a time threshold after a request time associated with the request.

20 Claims, 7 Drawing Sheets

MULTI-USER BIOMETRIC AUTHENTICATION

BACKGROUND

Biometric authentication is an identification and/or security process that uses a biologically unique identifier (e.g., fingerprint, voice, iris, retina, or face) of an authorized user (e.g., an account owner or a device owner) to authenticate a user trying to gain access to physical and/or digital resources (e.g., an account or a device). The process includes scanning a biologically unique identifier of the user trying to gain access and comparing the scan to a stored copy of the biologically unique identifier of the authorized user. If there is a sufficient match, then the user is granted access to the physical and/or digital resources.

SUMMARY

Some implementations described herein relate to a system for multi-user biometric authentication. The system may include one or more memories and one or more processors communicatively coupled to the one or more memories. The one or more processors may be configured to receive a first set of interaction request data indicating a request by a first user to perform a requested interaction with an interaction party via a user account, wherein the first user is associated with the user account, and wherein the first set of interaction request data indicates a first user identifier and first user biometric authentication data associated with the first user. The one or more processors may be configured to identify, based on receiving the first set of interaction request data, a second user identifier associated with a second user associated with the user account. The one or more processors may be configured to determine whether interaction information associated with the requested interaction and indicated by the first set of interaction request data satisfies an authorization condition. The one or more processors may be configured to transmit, to a second user device associated with the second user and based on determining that the interaction information satisfies the authorization condition, a second user authentication request to authenticate the second user and to authorize the requested interaction. The one or more processors may be configured to receive, from the second user device, second user biometric authentication data associated with the second user. The one or more processors may be configured to authorize the requested interaction based on receiving the second user biometric authentication data within a time threshold after a request time associated with the request and indicated by the first set of interaction request data.

Some implementations described herein relate to a method of multi-user biometric authentication. The method may include receiving, by a system having one or more processors and from an interaction device, interaction request data indicating a request by a secondary user, associated with a user account, to perform a requested interaction via the user account, wherein the interaction request data indicates a secondary user identifier corresponding to the secondary user. The method may include transmitting, by the system and to the interaction device, a secondary user authentication request to authenticate the secondary user. The method may include receiving, by the system and from the interaction device, secondary user biometric authentication data associated with the secondary user. The method may include identifying, by the system and based on the secondary user identifier, a primary user identifier corresponding to a primary user associated with the user account. The method may include transmitting, by the system and to a primary user device associated with the primary user, a second user authentication request to authenticate the primary user if information associated with the requested interaction and indicated by the interaction request data satisfies one or more conditions. The method may include receiving, by the system and from the primary user device, primary user biometric authentication data associated with the primary user. The method may include authorizing the requested interaction based on receiving the primary user biometric authentication data.

Some implementations described herein relate to a non-transitory computer-readable medium that stores a set of instructions for a device. The set of instructions, when executed by one or more processors of the device, may cause the device to receive interaction request data indicating a request by a first user, associated with a user account, to perform a requested interaction via the user account, wherein the interaction request data indicates a first user identifier and first user biometric authentication data associated with the first user. The set of instructions, when executed by one or more processors of the device, may cause the device to identify, based on receiving the first set of interaction request data, one or more second users associated with the user account. The set of instructions, when executed by one or more processors of the device, may cause the device to determine if interaction information associated with the requested interaction and indicated by the interaction request data satisfies an authorization condition. The set of instructions, when executed by one or more processors of the device, may cause the device to transmit, to one or more second user devices associated with the one or more second users and based on determining that the interaction information satisfies the authorization condition, one or more second user authentication requests to authenticate the one or more second users and to authorize the requested interaction. The set of instructions, when executed by one or more processors of the device, may cause the device to receive, from a second user device, of the one or more second user devices, second user biometric authentication data associated with a second user of the one or more second users. The set of instructions, when executed by one or more processors of the device, may cause the device to authorize the requested interaction based on receiving the second user biometric authentication data.

DETAILED DESCRIPTION

The following detailed description of example implementations refers to the accompanying drawings. The same reference numbers in different drawings may identify the same or similar elements.

A user account (e.g., an account with an organization or an institution) may have multiple users associated with the user account. For example, two users of a particular user account may be partners, who may be joint holders of the account. As another example, two users of a particular user account may be two parents, one or both of whom may be primary account holders or users (e.g., have authority and/or decision-making control over the user account), and a third user may be a dependent (e.g., a child in college), who may be a secondary account holder or user (e.g., have limited control over and/or access to the user account). Any one of the users may perform an interaction (e.g., a transaction) associated with or via the account. In some situations, one of the other users may desire to approve a particular interaction. However, often the user performing the interaction is able to proceed with the interaction, and the other user may not be informed of the interaction until it has been completed. If the other user desires to undo and/or remedy the interaction, significant time and/or resources by both the user and the institution may be required, and in some cases, may be impossible to undo. Accordingly, it may be desired to have a system that enables multiple levels of security to prevent interactions by a user of a user account having multiple users, when the interactions may be unauthorized and/or undesired by one or more of the other users of the user account.

Some implementations described herein relate to a system for multi-user biometric authentication for interactions associated with a user account having multiple users. When one of the users (e.g., the requesting user) requests to perform an interaction, the system may require biometric authentication data of the requesting user. The biometric authentication data may be a confirmation of the identity of the requesting user (e.g., performed by a user device of the requesting user). For example, the biometric input may be verified locally on the user device, after which the user device may transmit a verification message to the system. Alternatively, the biometric authentication data may correspond to scanned biometric data (e.g., scanned by the user device and/or an interaction party device), which the system may use to compare with corresponding stored biometric data to confirm the identity. For example, the user device may transmit the biometric input to the system for verification. The system may identify at least one other user of the user account (e.g., an authorizing user) and request authentication data from the other user to authorize the interaction. The system may receive biometric authentication data of the authorizing user (e.g., from a user device of the authorizing user) that may be a confirmation of the identity of the authorizing user. Based on receiving this confirmation, the system may authorize (e.g., perform and/or complete) the requested interaction.

By requiring biometric authentication data of both a requesting user and an authorizing user, the system is able to provide multiple levels of security for the requesting user to perform an interaction associated with the account. If the biometric authentication data is not received for both users, then the interaction may be denied. As a result, the system prevents unauthorized interactions from being completed, where the process may be time and system-intensive to undo and/or remedy the unauthorized interaction, if even possible. Additionally, the computing memory and resources to perform the unauthorized interactions may be saved, thereby increasing the overall operating efficiency of the system. Further, the disclosed embodiments may address technical issues with securely transmitting and/or aggregating biometric information from spatially separated individuals (e.g., individuals in different geometric locations), such as providing access to secure locations (e.g., a safe) and/or information (e.g., a secure message).

Figure 1A:
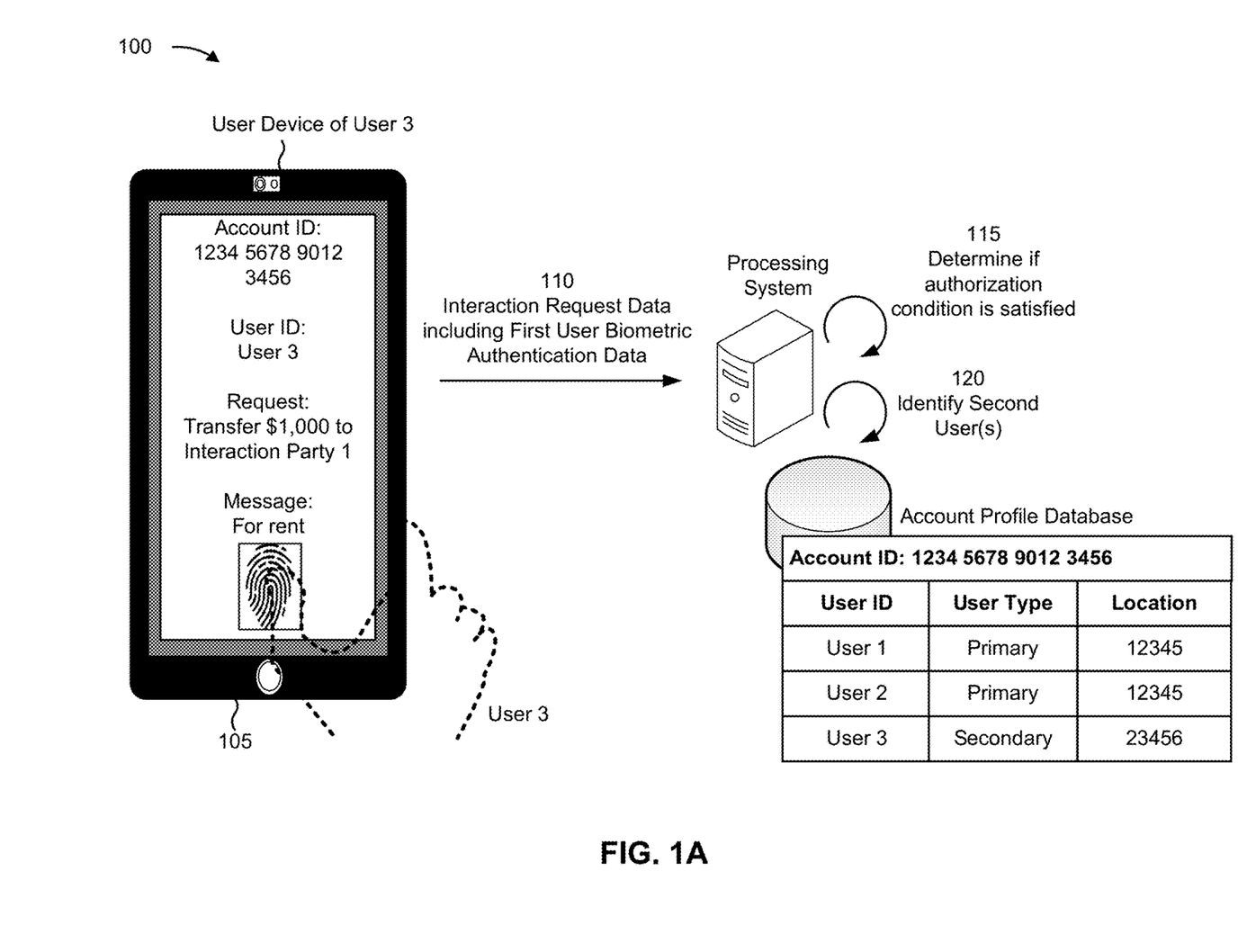
FIGS. 1A and 1B are diagrams of an example implementation relating to multi-user biometric authentication, in accordance with some embodiments of the present disclosure.
Figure 1B:
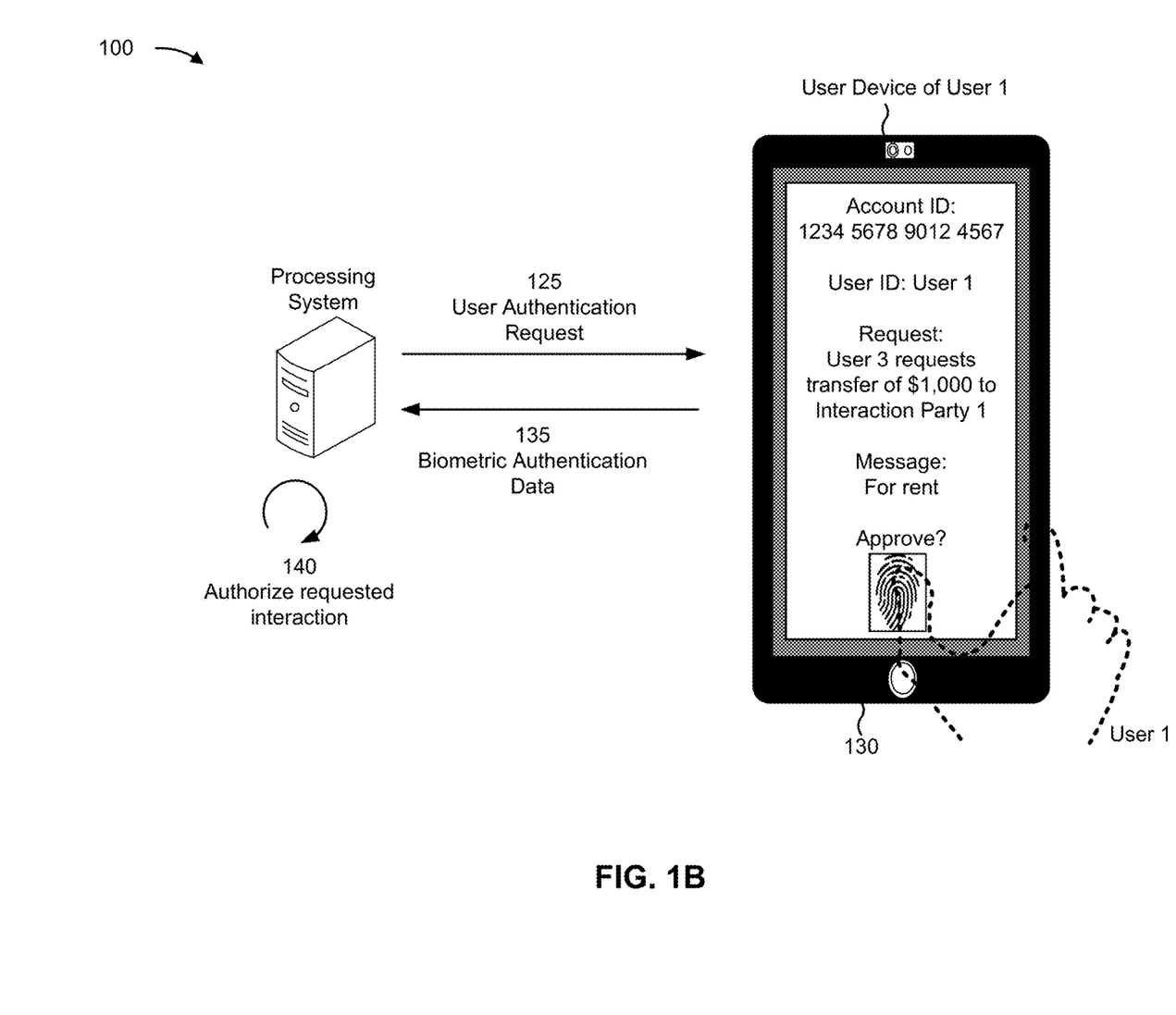

FIGS. 1A and 1B are diagrams of an example 100 associated with multi-user biometric authentication. As shown in FIGS. 1A and 1B, example 100 includes a processing system, an account profile database, user devices, and an interaction party device. These devices are described in more detail in connection with FIGS. 3 and 4.

As shown in FIG. 1A, a user account may have multiple users (e.g., Users 1, 2, and 3 in FIG. 1A) associated with the user account. The user account may have an account identifier (e.g., an account ID number, or a primary account number (PAN)) by which the user account may be identified. Additionally, the users may be associated with corresponding user identifiers by which the users may be identified. The users may be joint account holders. Additionally, or alternatively, at least one of the users may be a primary account holder or primary user (e.g., having authority and/or decision-making control over the user account), and at least one of the other users may be a secondary account holder or secondary user (e.g., having limited control over and/or access to the user account). For example, two primary account holders (e.g., User 1 and User 2 in FIG. 1A) may be parents, and a secondary account holder (e.g., User 3 in FIG. 1A) may be a child or a dependent.

As further shown in FIG. 1A, one of the users (e.g., User 3) may request to perform an interaction (e.g., a transaction) associated with the user account. For example, as shown by reference number 105, the requesting user (also referred to as the first user) may initiate the requested interaction via a user device of the user (e.g., an online interaction or a contactless interaction). To proceed with the requested interaction, the requesting user's identity may need to be authenticated. To do so, as further shown by reference number 105, the user device of the requesting user may include a biometric scanner (e.g., a fingerprint scanner, a retina scanner, facial recognition, voice recognition, hand and/or vein pattern recognition, iris recognition, and/or hand geometry) by which the user device may scan a biometric feature of the requesting user (e.g., a fingerprint) and obtain scanned biometric data corresponding to the scanned biometric feature. The user device may compare the scanned biometric data with stored biometric data corresponding to a biometric credential of the requesting user (e.g., stored on a memory of the user device or stored on a remote server or database). If the user device determines that the scanned biometric data sufficiently matches the stored biometric data (e.g., a threshold number of minutiae points match), then the user device may transmit, and the processing system may receive, interaction request data (also referred to as a first set of interaction request data) indicating interaction information associated with the requested interaction, as shown by reference number 110. The first set of interaction request data may indicate the user identifier of the requesting user (also referred to as the first user identifier) and/or biometric authentication data of the requesting user (also referred to as first user biometric authentication data). The first user biometric authentication data may indicate a successful match by the user device of the scanned biometric data with the stored biometric data, and therefore, authorization to proceed with the interaction request process.

In some scenarios, the requested interaction may require authorization by another one of the users (also referred to as an authorizing user or a second user) associated with the user account. As shown by reference number 115, the processing system may determine if one or more authorization conditions are satisfied to determine if such authorization is needed. In some implementations, one or more of the authorization conditions may be based on account information associated with the user account and/or user information associated with the users, such as a user status (e.g., primary or secondary account holder or user) of the requesting user. For example, if the requesting user is a secondary account holder, then an authorizing user that is a primary account holder may need to authorize the requested interaction.

Additionally, or alternatively, one or more of the authorization conditions may be based on interaction information related to the requested interaction and indicated by the first set of interaction request data. For example, the first set of interaction request data may indicate an interaction amount (e.g., $1000 in FIG. 1A) associated with the requested interaction. If the interaction amount exceeds an interaction amount threshold (e.g., $500), then an authorization condition may be satisfied, and an authorizing user may need to authorize the requested interaction. The interaction amount threshold may be adjustable (e.g., by a primary account holder), and different users may have different interaction amount thresholds associated with the users (e.g., the interaction amount threshold for a primary account holder may be higher than the interaction amount threshold for a secondary account holder).

Additionally, or alternatively, the first set of interaction request data may indicate an interaction type associated with the requested interaction, and the authorization condition may be based on the interaction type (e.g., certain interaction types may require additional authorization from the second user whereas other interaction types may not require the additional authorization). For example, an interaction type may be a withdrawal or transfer of funds, which may require the additional authorization. As another example, an interaction type may be payment of a bill (e.g., a credit card or medical statement), which may not require the additional authorization.

Additionally, or alternatively, the first set of interaction request data may indicate an interaction location (e.g., a zip code and/or geographic coordinates) associated with the requested interaction. If the interaction location is outside of a distance threshold (e.g., 100 miles) from a user location associated with the requesting user (e.g., as stored in the account profile database under the user account and associated with the first user identifier), then an authorization condition may be satisfied, and the additional authorization from the authorizing user may be required.

Additionally, or alternatively, the user account may have approved interaction party information corresponding to a list of approved interaction parties. The approved interaction parties may apply to the user account overall, or each user may have at least a subset of the approved interaction parties applied to the particular user. The first set of interaction request data may indicate an interaction party identifier by which the interaction party that is part of the requested interaction (e.g., Interaction Party 1 in FIG. 1A) may be identified. If the interaction party identifier does not match an approved interaction party in the list of approved interaction parties, then an authorization condition may be satisfied, and the additional authorization from the authorizing user may be required. If the interaction party identifier matches an approved interaction party, then no additional authorization is necessary, and the processing system may approve and/or complete the requested interaction.

In some implementations, the different authorization conditions may be ranked based on a relative priority. Thus, in a scenario in which a particular authorization condition is satisfied, thereby requiring authorization from the authorizing user, but the particular authorization condition has a lower rank than another authorization condition that is not satisfied, then the additional authorization by the authorizing user may not be required. For example, an interaction party status (e.g., an approved interaction party or not) may have a higher priority than whether or not the interaction amount exceeds the interaction amount threshold. Thus, even if the interaction amount exceeds the interaction amount threshold, which would normally require authorization from the authorizing user, but the interaction party identifier indicates an approved interaction party, then the processing system may bypass obtaining authorization from the authorizing user and approve and/or complete the requested interaction.

As shown by reference number 120, based on determining that an authorization condition is satisfied, the processing system may identify (e.g., from the account profile database) at least one other user of the user account as the authorizing user (or second user). The processing system may identify the authorizing user having a higher user status than the requesting user. For example, in scenarios in which the requesting user is a secondary account holder, the processing system may identify a primary account holder as the authorizing user. Additionally, or alternatively, if the requesting user is a primary account holder, then the processing system may bypass obtaining authorization from another user. Alternatively, the processing system may require authorization from at least one other user having the same user status (e.g., another primary account holder).

As shown in FIG. 1B and by reference number 125, based on determining that an authorization condition is satisfied, the processing system may transmit, to a user device of the authorizing user (e.g., User 1 in FIG. 1B) a user authentication request (also referred to as a second user authentication request or a primary user authentication request). The user authentication request may include the interaction information associated with the requested interaction (e.g., the user identifier of the requesting user, the interaction type, the interaction amount, and/or the interaction party). As shown by reference number 130, the user device of the authorizing user may display the interaction information (e.g., as an in-application notification or user interface).

Additionally, the authentication request may request biometric authentication data of the authorizing user (also referred to as second user biometric authentication data). As further shown by reference number 130, to obtain the biometric authentication data of the authorizing user, the user device of the authorizing user may include a biometric scanner (e.g., a fingerprint scanner) by which the user device may scan a biometric feature of the authorizing user (e.g., a fingerprint) and obtain scanned biometric data corresponding to the scanned biometric feature. The user device may compare the scanned biometric data with stored biometric data corresponding to a biometric credential of the authorizing user and stored on the user device (e.g., on a memory of the user device) and/or on a remote server or database. If the user device determines that the scanned biometric data sufficiently matches the stored biometric data (e.g., a threshold number of minutiae points match), then the user device may transmit, and the processing system may receive, the biometric authentication data of the authorizing user, as shown by reference number 135. The biometric authentication data may indicate a successful match by the user device of the scanned biometric data with the stored biometric data, and therefore, authorization to proceed with the interaction request process. Based on receiving the biometric authentication data, the processing system may authorize and/or complete the requested interaction, as shown by reference number 140.

In some implementations, the first set of interaction request data may indicate a request time associated with the request for the requested interaction (e.g., a timestamp of when the request was initiated). If the processing system does not receive the biometric authentication data of the authorizing user within a time threshold (e.g., 30 seconds, 1 minute, or 5 minutes) after the request time, then the processing system may deny or otherwise cancel the request for the requested interaction.

In some scenarios, the requesting user may initiate a second request to perform a second requested interaction. The processing system may receive a second set of interaction request data indicating the second request, in a similar manner as receiving the first set of interaction request data indicating the first request, as described above. The second set of interaction request data may indicate a second request time (e.g., a timestamp of when the second request was made). If the second request time is within a second time threshold (e.g., 1 hour, 24 hours, or multiple days) from receiving the biometric authentication data of the authorizing user (e.g., in connection with a previous request), then the processing system may authorize and/or complete the second requested interaction.

In some implementations, the requesting user may be able to provide a description of the requested interaction (e.g., via the user device of the requesting user). For example, when initiating the request, a dedicated entry field may be presented on the display of the user device, and the requesting user may enter the description in the entry field (e.g., via a keyboard or via a microphone associated with the user device). The second user authentication request sent by the processing system to the user device of the authorizing user may include description data indicating the description. As a result, the authorizing user may be informed about the details of the requested interaction in order to make a decision about whether or not to approve the requested interaction (e.g., by providing the biometric authentication data).

In some implementations, the type of biometric authentication (e.g., fingerprint scan, retina scan, facial recognition, voice recognition, hand and/or vein pattern recognition, iris recognition, and/or hand geometry) and/or the number of types of biometric authentication required for one or more users may differ based on characteristics associated with the user account and/or the particular interaction requiring the multi-user biometric authentication. For example, under the user account, a particular type of biometric authentication may be associated with each user, which may be changeable under settings of the user account. As an example, the requesting user may have a fingerprint scan associated with the requesting user, and the authorizing user may have facial recognition associated with the authorizing user.

Additionally, or alternatively, an interaction having a certain interaction type of interaction associated with the interaction may require a different type of biometric authentication and/or a different number of types of biometric authentication. For example, an interaction associated with a purchase may require a single type of biometric authentication from each user (e.g., the requesting user and the authorizing user). Additionally, or alternatively, a purchase may require a fingerprint scan. As another example, an interaction associated with a transfer of funds from the account may require a facial scan (e.g., instead of a fingerprint scan). Additionally, or alternatively, a transfer of funds may require multiple types of biometric authentication (e.g., fingerprint scan and a facial scan) from one user (e.g., the authorizing user) or both users (e.g., the requesting user and the authorizing user).

Additionally, or alternatively, an amount associated with the particular interaction may dictate the type of biometric authentication and/or how many types of biometric authentication are required for each user. For example, if an interaction amount associated with the purchase is within a first range (e.g., less than $1000), then only the single type of biometric authentication from each user may be required. Additionally, or alternatively, the single type of biometric authentication may be a fingerprint scan. If the interaction amount is within a second range (e.g., between $1000 and $10,000), then a facial scan (as opposed to a fingerprint scan) may be required from one user (e.g., the authorizing user) or both users (e.g., the requesting user and the authorizing user). Additionally, or alternatively, for an interaction amount within the second range, two types of biometric authentication may be required from one or both users (e.g., the requesting user may be required to provide a fingerprint scan, and the authorizing user may be required to provide a fingerprint scan and a retina scan).

The system described above offers multiple levels of security for users of a commonly-used account when one of the users attempts to perform an interaction (e.g., a transaction) involving the account. For example, the system may require biometric authentication data (e.g., fingerprint data) of the requesting user and of at least one other user. If the biometric authentication data is not received for both users, then the interaction may be denied. As a result, the system prevents unauthorized interactions from being completed, where the process may be time and system-intensive to undo and/or remedy the unauthorized interaction. Additionally, the computing memory and resources to perform the unauthorized interactions may be saved, thereby increasing the overall operating efficiency of the system.

As indicated above, FIGS. 1A and 1B are provided as an example. Other examples may differ from what is described with regard to FIGS. 1A and 1B. For example, although the example described above involves the requesting user initiating a request for the requested interaction and subsequently scanning the requesting user's biometric data via the user device of the requesting user, the requesting user alternatively may initiate the request and scan the requesting user's biometric data via an interaction party device of an interaction party associated with the requested interaction, as described in connection with FIGS. 2A and 2B. Alternatively, the requesting user may initiate the request via a physical medium of the requesting user (e.g., a transaction card) interacting with the interaction party device (e.g., via sliding or inserting the physical medium into the interaction party device). In such a scenario, the physical medium may scan the requesting user's biometric data, and the physical medium may confirm the requesting user's identity by comparing the scanned biometric data with stored biometric data stored on the physical medium (e.g., on a memory of the physical medium) in a similar manner as the user device in the example described above. The interaction party device may then transmit to the processing system the biometric authentication data of the requesting user.

Furthermore, although the example described above involves implementation of multi-user biometric authentication with respect to interactions involving a user account shared by multiple users, the multi-user biometric authentication may be used in other implementations in which users are spatially separated from one another (e.g., are in different geographic locations), and a particular action by one of the users requires biometric authentication of the other user(s) (e.g., unlocking a door, accessing a safe, sending and/or opening a secure message, or the like).

Figure 2A:
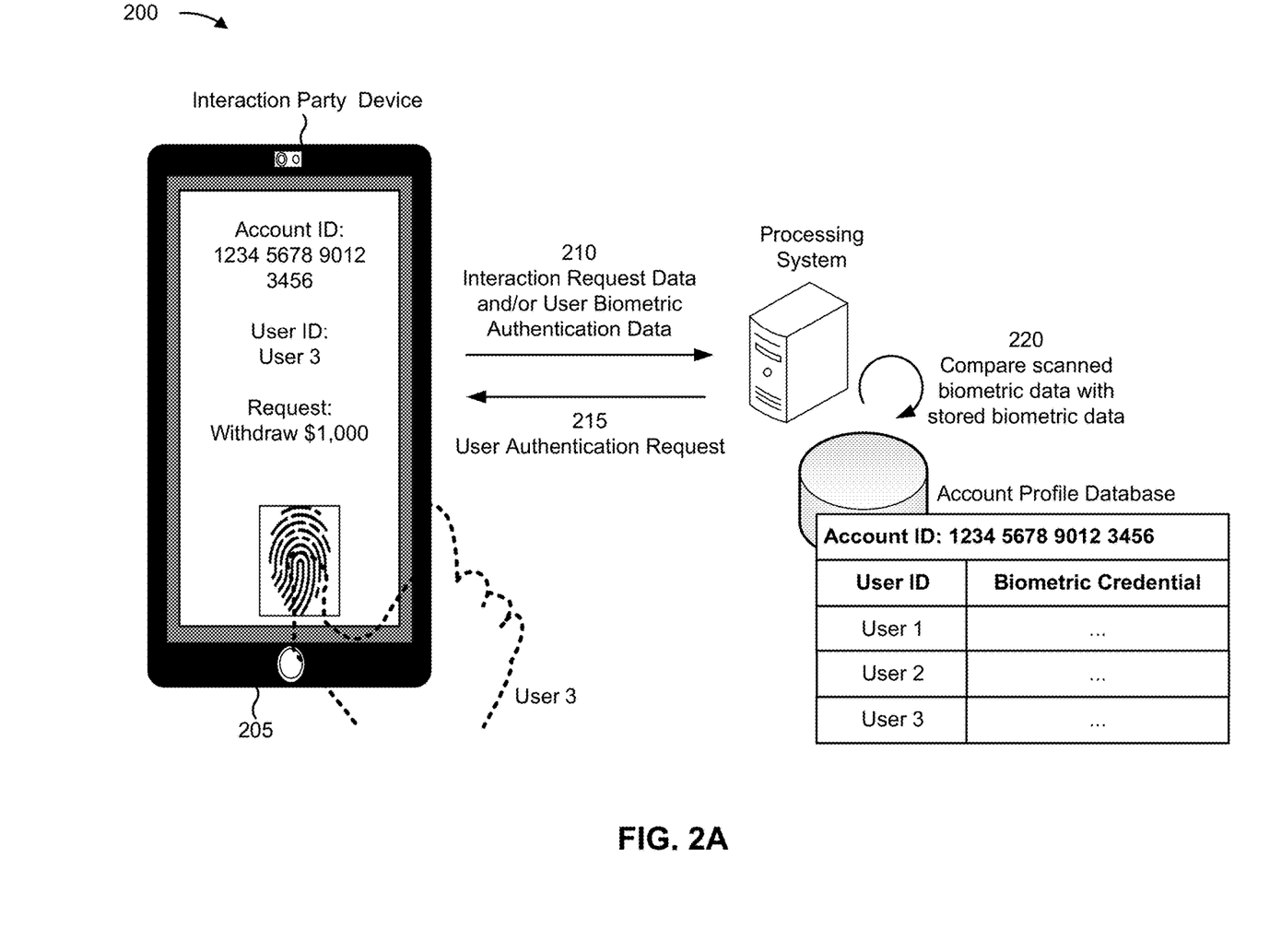
FIGS. 2A and 2B are diagrams of an example implementation relating to multi-user biometric authentication, in accordance with some embodiments of the present disclosure.
Figure 2B:
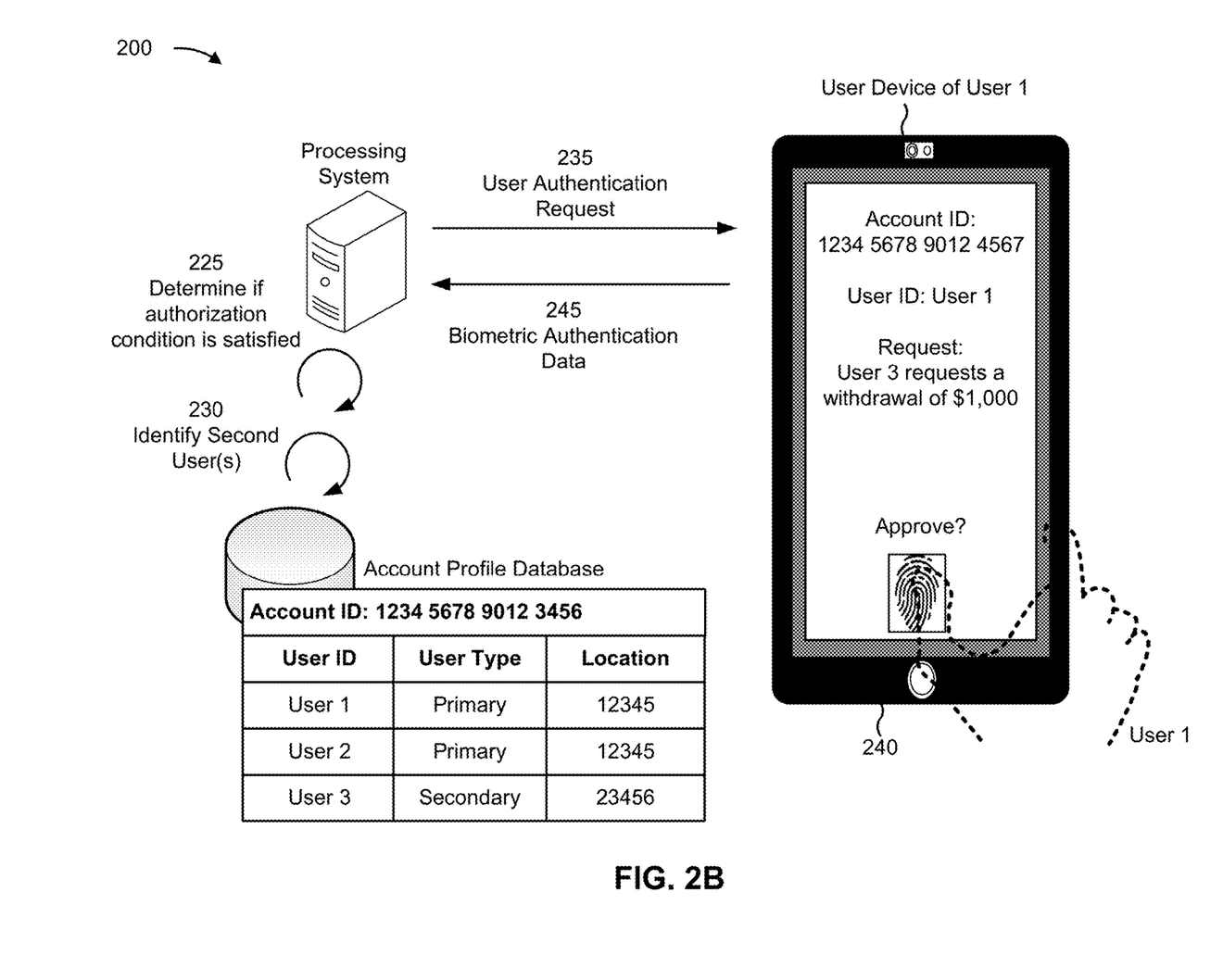

FIGS. 2A and 2B are diagrams of an example 200 associated with multi-user biometric authentication. As shown in FIGS. 2A and 2B, example 200 includes a processing system, an account profile database, an interaction party device, and a user device. These devices are described in more detail in connection with FIGS. 3 and 4.

As shown in FIG. 2A, the account profile database may store biometric data (also referred to as stored biometric data) of biometric credentials corresponding to biometric features (e.g., fingerprints) of the users of the user account. In some scenarios, as shown by reference number 205, the requesting user (also referred to as a secondary account holder or secondary user), requesting the requested interaction may initiate the request via an interaction party device (also referred to as an interaction device). For example, the interaction party device may be an automated teller machine (ATM), from which the requesting user may be making a withdrawal, or a point-of-sale (PoS) terminal. As shown by reference number 210, the interaction party device may transmit, and the processing system may receive, interaction request data based on the requested interaction and indicating a user identifier of the requesting user. As shown by reference number 215, the processing system may transmit, to the user device, a user authentication request (also referred to as a secondary user authentication request) to authenticate the identity of the requesting user. The authentication request may be a request for biometric data (e.g., fingerprint data) of the requesting user. In such scenarios, the interaction party device may have a biometric scanner (e.g., a fingerprint scanner) to scan the biometric feature (e.g., fingerprint) of the requesting user. The interaction party device may transmit, and the processing system may receive, biometric authentication data of the requesting user (also referred to as secondary user biometric authentication data) that includes the scanned biometric data. Alternatively, the interaction request data may include the biometric authentication data (e.g., if the scan of the requesting user's biometric feature occurs at the time of initiating the request).

As shown by reference number 220, the processing system may compare the scanned biometric data with stored biometric data corresponding to the requesting user stored in the account profile database. If the processing system determines that the scanned biometric data does not sufficiently match the stored biometric data (e.g., a threshold number of minutiae points do not match), then the processing system may deny or otherwise cancel the request. If the processing system determines that the scanned biometric data sufficiently matches the stored biometric data, then the processing system may proceed with the interaction authentication process.

As shown in FIG. 2B and by reference number 225, the processing system may determine if one or more authorization conditions are satisfied to determine if authorization by an authorizing user (e.g., a primary account holder or primary user) of the user account is required. The authorization conditions may be the same as or similar to the authorization conditions described above in connection with example 100. As shown by reference number 230, the processing system may identify (e.g., from the account profile database) at least one other user of the user account, who may have a higher user status than the secondary user, as the authorizing user. For example, the processing system may identify a primary account holder (or primary user) as the authorizing user.

As shown by reference number 235, based on determining that an authorization condition is satisfied, the processing system may transmit, to a user device of the authorizing user (e.g., User 1 in FIG. 2B) a user authentication request. The user authentication request may include the interaction information associated with the requested interaction (e.g., the user identifier of the requesting user, the interaction type, the interaction amount (e.g., a threshold amount of currency), and/or the interaction party). As shown by reference number 240, the user device of the authorizing user may display the interaction information (e.g., as an in-application notification or user interface).

Additionally, the authentication request may request biometric authentication data of the authorizing user (also referred to as primary user biometric authentication data). As further shown by reference number 240, to obtain the biometric authentication data, the user device of the authorizing user may include a biometric scanner (e.g., a fingerprint scanner) by which the user device may scan a biometric feature of the authorizing user (e.g., a fingerprint) and obtain scanned biometric data corresponding to the scanned biometric feature. The user device may compare the scanned biometric data with stored biometric data corresponding to a biometric credential of the authorizing user and stored on the user device (e.g., on a memory of the user device) and/or on a remote server or database. If the user device determines that the scanned biometric data sufficiently matches the stored biometric data (e.g., a threshold number of minutiae points match), then the user device may transmit, and the processing system may receive, the biometric authentication data of the authorizing user, as shown by reference number 245. The biometric authentication data may indicate a successful match by the user device of the scanned biometric data with the stored biometric data, and therefore, authorization to proceed with the interaction request process. Based on receiving the biometric authentication data of the authorizing user, the processing system may authorize and/or complete the requested interaction.

As with the system of example 100, the system described above offers multiple levels of security for users of a commonly-used account by requiring biometric authentication data of multiple users when one of the users attempts to perform an interaction (e.g., a transaction) involving the account from a device of an interaction party (e.g., an ATM when making a withdrawal). As a result, the system prevents unauthorized interactions from being completed, where the process may be time and system-intensive to undo and/or remedy the unauthorized interaction. Additionally, the computing memory and resources to perform the unauthorized interactions may be saved, thereby increasing the overall operating efficiency of the system.

As indicated above, FIG. 2 is provided as an example. Other examples may differ from what is described with regard to FIG. 2.

Figure 3:
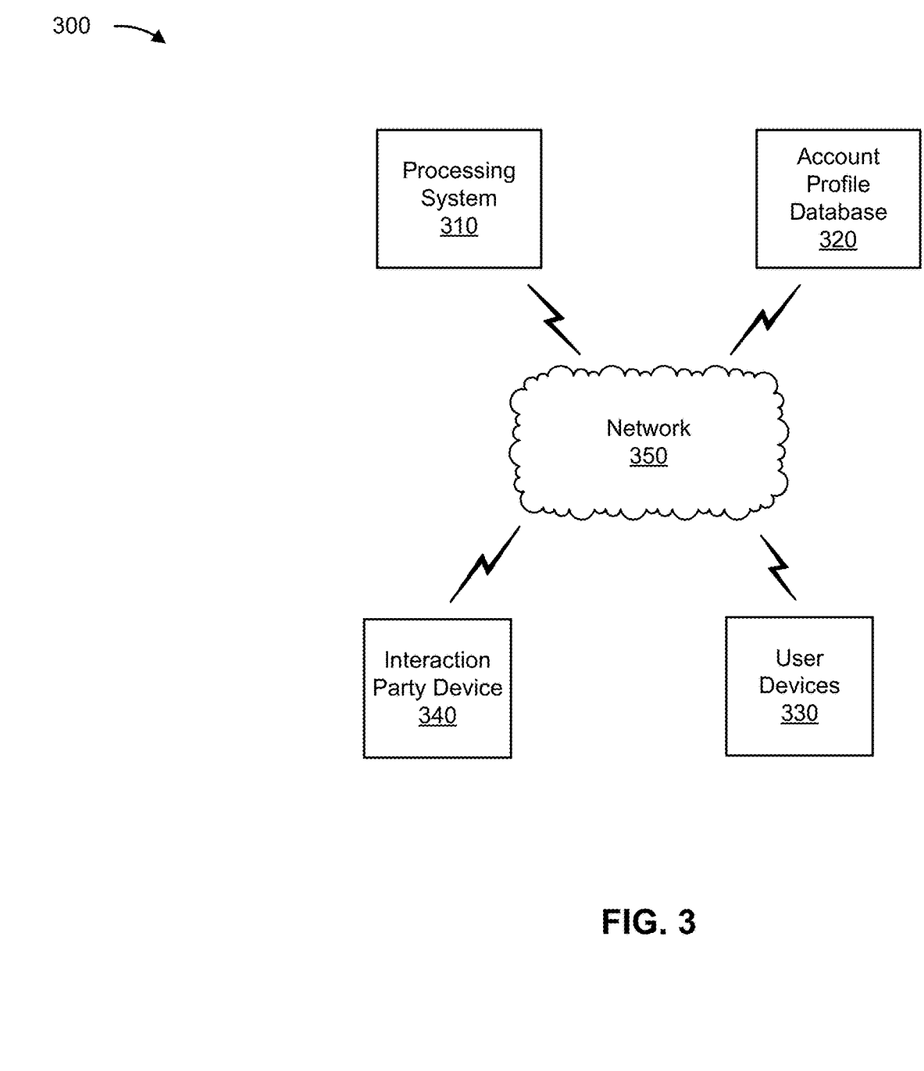
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a processing system 310, an account profile database 320, user devices 330, an interaction party device 340, and a network 350. Devices of environment 300 may interconnect via wired connections, wireless connections, or a combination of wired and wireless connections.

The processing system 310 includes one or more devices capable of receiving, generating, storing, processing, providing, and/or routing information associated with multi-user biometric authentication, as described elsewhere herein. The processing system 310 may include a communication device and/or a computing device. For example, the processing system 310 may include a server, such as an application server, a client server, a web server, a database server, a host server, a proxy server, a virtual server (e.g., executing on computing hardware), or a server in a cloud computing system. In some implementations, the processing system 310 includes computing hardware used in a cloud computing environment.

The account profile database 320 includes one or more devices capable of receiving, generating, storing, processing, and/or providing information associated with multi-user biometric authentication, as described elsewhere herein. The account profile database 320 may include a communication device and/or a computing device. For example, the account profile database 320 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the account profile database 320 may store account information, including an account identifier associated with a user account, one or more user identifiers associated with one or more users of the user account, one or more biometric credentials (e.g., fingerprint data) associated with the user(s), and/or data items associated with the user(s), as described elsewhere herein.

The user devices 330 include one or more devices capable of receiving, generating, storing, processing, and/or providing information associated with multi-user biometric authentication, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The interaction party device 340 includes one or more devices capable of receiving, generating, storing, processing, and/or providing information associated with multi-user biometric authentication, as described elsewhere herein. The interaction party device 340 may include a communication device and/or a computing device. For example, the interaction party device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

Additionally, or alternatively, the interaction party device 340 includes one or more devices capable of facilitating an electronic exchange. For example, the interaction party device 340 may include a point-of-sale (PoS) terminal, a payment terminal (e.g., a credit card terminal, a contactless payment terminal, a mobile credit card reader, or a chip reader), a secure access terminal (e.g., a terminal equipped with an encrypted connection to a server and/or database), a financial service kiosk (e.g., a banking kiosk), and/or an ATM. The interaction party device 340 may include one or more input components and/or one or more output components to facilitate obtaining data (e.g., account information) from a physical medium (e.g., a transaction card, a mobile device executing a payment application, or the like) and/or to facilitate interaction with and/or authorization from an owner or account holder of the physical medium. Example input components of the interaction party device 340 include a number keypad, a touchscreen, a biometric scanner (e.g., a fingerprint scanner), a magnetic stripe reader, a chip reader, and/or an RF signal reader (e.g., an NFC reader). Example output devices of the interaction party device 340 may include a display and/or a speaker.

The network 350 includes one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
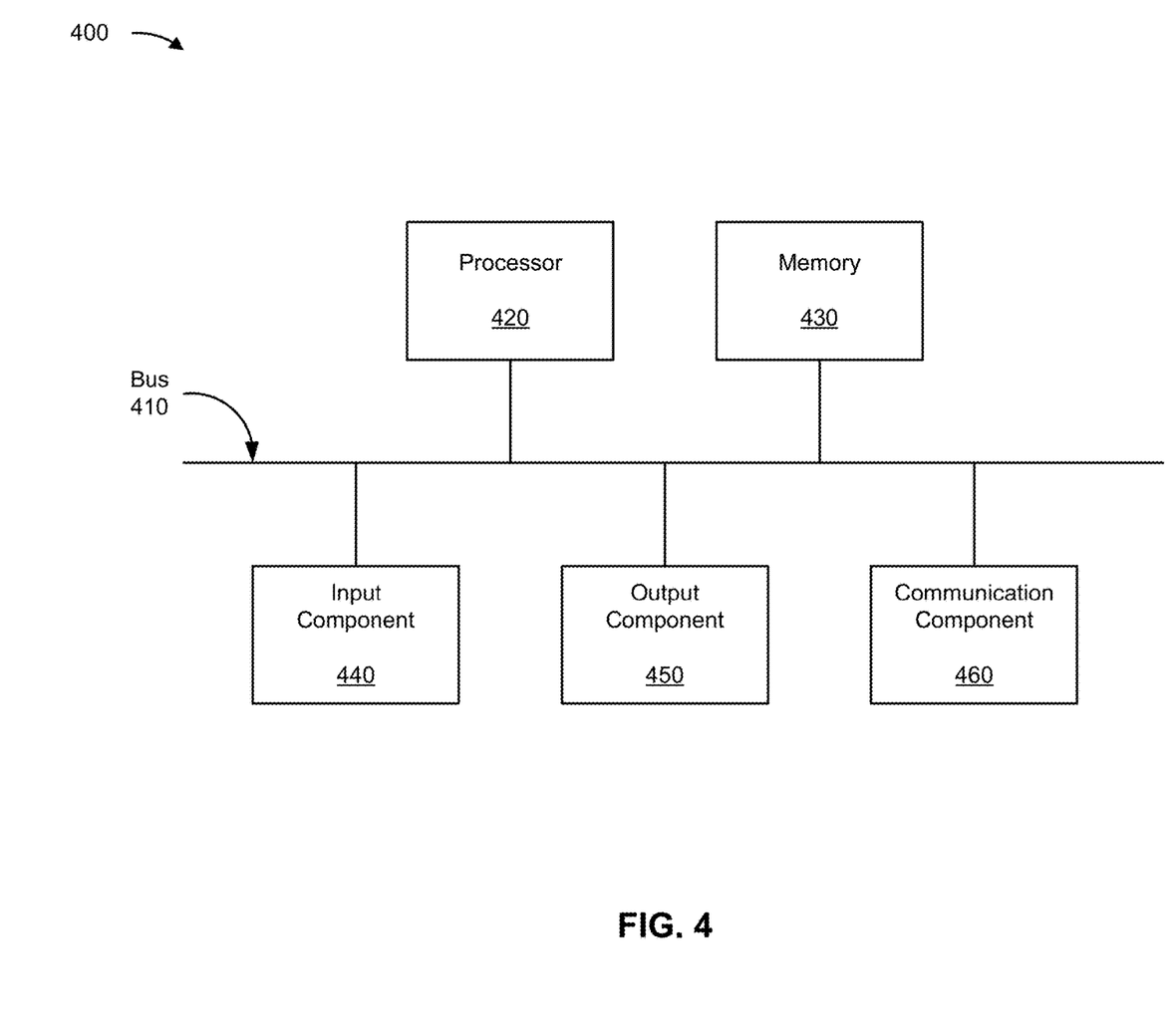
FIG. 4 is a diagram of example components of one or more devices of FIG. 3, in accordance with some embodiments of the present disclosure.

FIG. 4 is a diagram of example components of a device 400, which may correspond to processing system 310, account profile database 320, user devices 330, and/or interaction party device 340. In some implementations, processing system 310, account profile database 320, user devices 330, and/or interaction party device 340 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
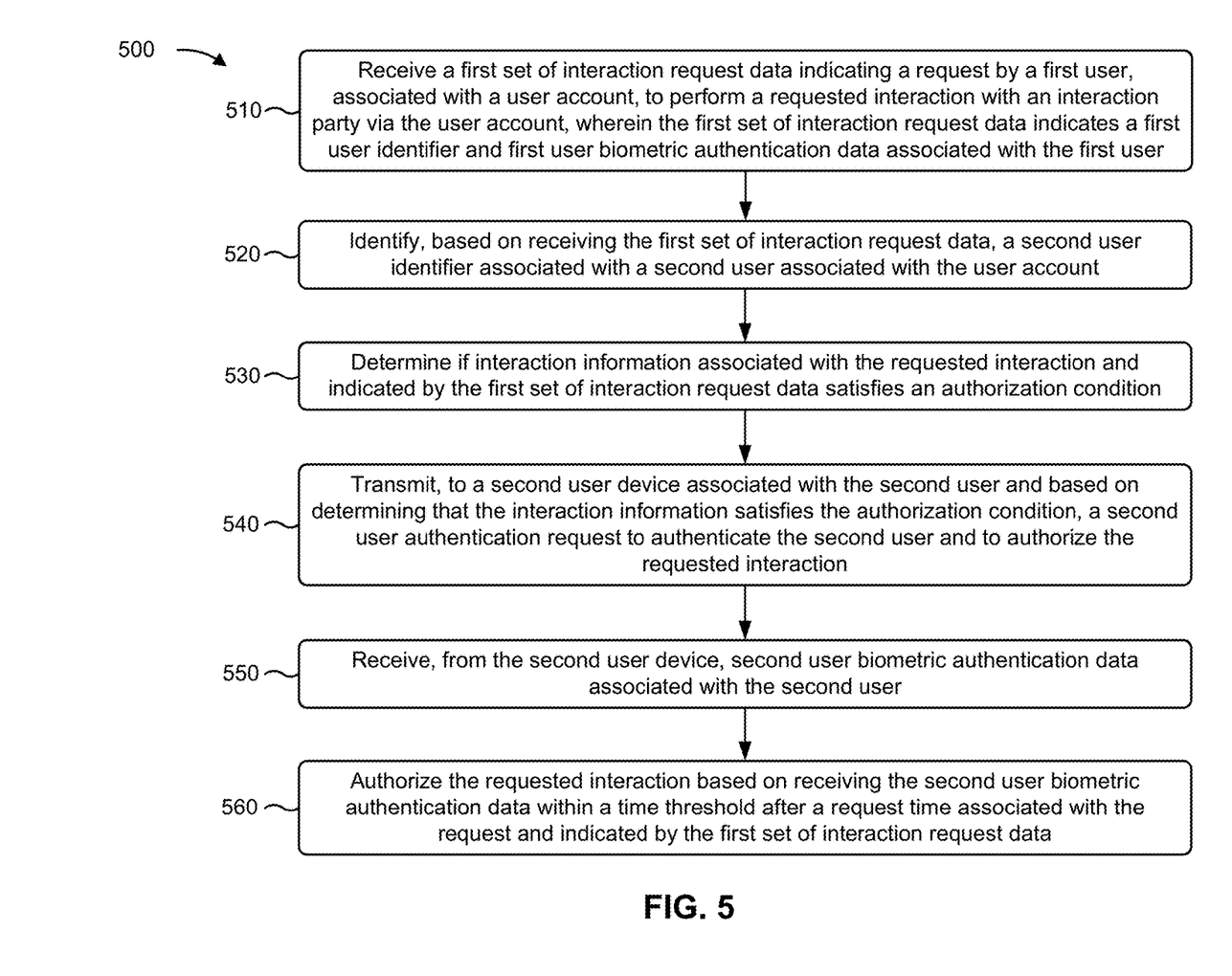
FIG. 5 is a flowchart of an example process relating to multi-user biometric authentication, in accordance with some embodiments of the present disclosure.

FIG. 5 is a flowchart of an example process 500 associated with multi-user biometric authentication. In some implementations, one or more process blocks of FIG. 5 may be performed by the processing system 310. In some implementations, one or more process blocks of FIG. 5 may be performed by another device or a group of devices separate from or including the processing system 310, such as one or more of the user devices 330 and/or the interaction party device 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a first set of interaction request data indicating a request by a first user to perform a requested interaction with an interaction party via a user account, wherein the first user is associated with the user account, and wherein the first set of interaction request data indicates a first user identifier and first user biometric authentication data associated with the first user (block 510). For example, the processing system 310 (e.g., using processor 420, memory 430, input component 440, and/or communication component 460) may receive a first set of interaction request data indicating a request by a first user, associated with a user account, to perform a requested interaction with an interaction party via the user account, wherein the first set of interaction request data indicates a first user identifier and first user biometric authentication data associated with the first user, as described above in connection with reference number 110 of FIG. 1A.

As further shown in FIG. 5, process 500 may include identifying, based on receiving the first set of interaction request data, a second user identifier associated with a second user associated with the user account (block 520). For example, the processing system 310 (e.g., using processor 420 and/or memory 430) may identify, based on receiving the first set of interaction request data, a second user identifier associated with a second user associated with the user account, as described above in connection with reference number 120 of FIG. 1A.

As further shown in FIG. 5, process 500 may include determining whether interaction information associated with the requested interaction and indicated by the first set of interaction request data satisfies an authorization condition (block 530). For example, the processing system 310 (e.g., using processor 420 and/or memory 430) may determine whether interaction information associated with the requested interaction and indicated by the first set of interaction request data satisfies an authorization condition, as described above in connection with reference number 115 of FIG. 1A.

As further shown in FIG. 5, process 500 may include transmitting, to a second user device associated with the second user and based on determining that the interaction information satisfies the authorization condition, a second user authentication request to authenticate the second user and to authorize the requested interaction (block 540). For example, the processing system 310 (e.g., using processor 420, memory 430, and/or communication component 460) may transmit, to a second user device associated with the second user and based on determining that the interaction information satisfies the authorization condition, a second user authentication request to authenticate the second user and to authorize the requested interaction, as described above in connection with reference number 125 of FIG. 1B.

As further shown in FIG. 5, process 500 may include receiving, from the second user device, second user biometric authentication data associated with the second user (block 550). For example, the processing system 310 (e.g., using processor 420, memory 430, input component 440, and/or communication component 460) may receive, from the second user device, second user biometric authentication data associated with the second user, as described above in connection with reference number 135 of FIG. 1B.

As further shown in FIG. 5, process 500 may include authorizing the requested interaction based on receiving the second user biometric authentication data within a time threshold after a request time associated with the request and indicated by the first set of interaction request data (block 560). For example, the processing system 310 (e.g., using processor 420 and/or memory 430) may authorize the requested interaction based on receiving the second user biometric authentication data within a time threshold after a request time associated with the request and indicated by the first set of interaction request data, as described above in connection with reference number 140 of FIG. 1B.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A, 1B, 2A, and 2B. Moreover, while process 500 has been discussed in relation to the systems and components of the preceding figures, process 500 can be performed using alternative systems, additional components, or fewer components. Process 500 should not be limited to being performed with the example systems, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for multi-user biometric authentication, the system comprising:
   one or more memories; and
   one or more processors, communicatively coupled to the one or more memories, configured to:
      receive a first set of interaction request data indicating a request by a first user to perform a requested interaction via a user account, wherein the first user is associated with the user account, and wherein the first set of interaction request data indicates a first user identifier and first user biometric authentication data associated with the first user;
      identify, based on receiving the first set of interaction request data, a second user identifier associated with a second user associated with the user account;
      determine whether interaction information associated with the requested interaction and indicated by the first set of interaction request data satisfies an authorization condition, wherein the authorization condition is ranked based on a relative priority;
      transmit, to a second user device associated with the second user and based on determining that the interaction information satisfies the authorization condition, a second user authentication request to authenticate the second user and to authorize the requested interaction;
      receive, from the second user device, second user biometric authentication data associated with the second user; and
      authorize the requested interaction based on receiving the second user biometric authentication data within a time threshold after a request time associated with the request and indicated by the first set of interaction request data.

2. The system of claim 1, wherein the first set of interaction request data indicates an interaction amount associated with the requested interaction, and
   wherein the authorization condition is that the interaction amount exceeds an interaction amount threshold.

3. The system of claim 1, wherein the first set of interaction request data indicates an interaction type associated with the requested interaction, and
   wherein the authorization condition is based on the interaction type.

4. The system of claim 1, wherein the interaction request data indicates an interaction location associated with the requested interaction, and wherein the authorization condition is that the interaction location is outside of a distance threshold from a first user location associated with the first user identifier in the user account.

5. The system of claim 1, wherein the user account or the first user identifier is associated with a list of one or more approved interaction parties, and
wherein the authorization condition is based on an interaction party associated with the requested interaction and the list of one or more approved interaction parties.

6. The system of claim 1, wherein the authorization condition is that the first user is a secondary account holder.

7. The system of claim 1, wherein the one or more processors are further configured to:
receive a second set of interaction request data indicating a second request by the first user to perform a second requested interaction;
determine that a second request time, associated with the request and indicated by the second set of interaction request data, is within a second time threshold from receiving the second user biometric authentication data; and
authorize the second requested interaction based on receiving the second user biometric authentication data within the second time threshold.

8. The system of claim 1, wherein the first set of interaction request data indicates a description of the requested interaction, and
wherein the second user authentication request includes the description of the requested interaction.

9. The system of claim 1, wherein the one or more processors receive the first set of interaction request data from a first user device of the first user, and
wherein the first user biometric authentication data indicates a first user authentication.

10. The system of claim 1, wherein the one or more processors receive the first set of interaction request data from an interaction party device associated with the requested interaction,
wherein the first user biometric authentication data indicates scanned first user biometric data, and
wherein the one or more processors are further configured to:
compare the scanned first user biometric data with stored first user biometric data to authenticate the first user.

11. A method of multi-user biometric authentication, comprising:
receiving, by a system having one or more processors and from an interaction device, interaction request data indicating a request by a secondary user, associated with a user account, to perform a requested interaction via the user account, wherein the interaction request data indicates a secondary user identifier corresponding to the secondary user;
transmitting, by the system and to the interaction device, a secondary user authentication request to authenticate the secondary user;
receiving, by the system and from the interaction device, secondary user biometric authentication data associated with the secondary user;
identifying, by the system and based on the secondary user identifier, a primary user identifier corresponding to a primary user associated with the user account;
transmitting, by the system and to a primary user device associated with the primary user, a primary user authentication request to authenticate the primary user if information associated with the requested interaction and indicated by the interaction request data satisfies one or more conditions, wherein the one or more conditions are ranked based on a relative priority;
receiving, by the system and from the primary user device, primary user biometric authentication data associated with the primary user; and
authorizing the requested interaction based on receiving the primary user biometric authentication data within a time threshold after a request time associated with the request and indicated by the interaction request data.

12. The method of claim 11, wherein the secondary user biometric authentication data indicates scanned secondary user biometric data, and
wherein the method further comprises:
comparing the scanned secondary user biometric data with stored secondary user biometric data to authenticate the secondary user.

13. The method of claim 11, wherein the one or more conditions are based on at least one of:
an interaction amount associated with the requested interaction and indicated by the interaction request data,
an interaction type associated with the requested interaction and indicated by the interaction request data,
an interaction location associated with the requested interaction and indicated by the interaction request data, or
a list of one or more approved interaction parties associated with the user account or with the secondary user identifier.

14. The method of claim 11, further comprising:
receiving, from the interaction device and with the interaction request data, description data indicating a description of the requested interaction; and
transmitting the description data to the primary user device and with the primary user authentication request.

15. The method of claim 11, wherein a condition, of the one or more conditions, is that the primary user biometric authentication data was received outside of a time threshold before a request time associated with the request and indicated by the interaction request data.

16. A non-transitory computer-readable medium storing a set of instructions, the set of instructions comprising:
one or more instructions that, when executed by one or more processors of a device, cause the device to:
receive interaction request data indicating a request by a first user, associated with a user account, to perform a requested interaction via the user account, wherein the interaction request data indicates a first user identifier and first user biometric authentication data associated with the first user;
identify, based on receiving the first set of interaction request data, one or more second users associated with the user account;
determine if interaction information associated with the requested interaction and indicated by the interaction request data satisfies an authorization condition, wherein the authorization condition is ranked based on a relative priority;
transmit, to one or more second user devices associated with the one or more second users and based on determining that the interaction information satisfies the authorization condition, one or more second user authentication requests to authenticate the one or more second users and to authorize the requested interaction;

receive, from a second user device, of the one or more second user devices, second user biometric authentication data associated with a second user of the one or more second users; and authorize the requested interaction based on receiving the second user biometric authentication data within a time threshold after a request time associated with the request and indicated by the interaction request data.

17. The non-transitory computer-readable medium of claim 16, wherein the one or more instructions, that cause the device to authorize the requested interaction, cause the device to:

authorize the requested interaction based on receiving the second user biometric authentication data for all of the one or more second users.

18. The non-transitory computer-readable medium of claim 16, wherein the interaction request data indicates a description of the requested interaction, and wherein the one or more second user authentication requests includes the description of the requested interaction.

19. The non-transitory computer-readable medium of claim 16, wherein the one or more instructions, when executed by the one or more processors, cause the device to receive the interaction request data from a first user device associated with the first user, and wherein the first user biometric authentication data indicates a first user authentication.

20. The non-transitory computer-readable medium of claim 16, wherein the one or more instructions, when executed by the one or more processors, cause the device to receive the interaction request data from an interaction party device associated with an interaction party of the requested interaction, wherein the first user biometric authentication data indicates scanned first user biometric data, and wherein the instructions, when executed by the one or more processors, further cause the device to:

compare the scanned first user biometric data with stored first user biometric data to authenticate the first user.

\* \* \* \* \*